United States Patent
Buckle

(10) Patent No.: US 8,393,400 B2
(45) Date of Patent: Mar. 12, 2013

(54) METAL-TO-METAL SEAL WITH WIPER ELEMENT AND WELLHEAD SYSTEM INCORPORATING SAME

(75) Inventor: Kevin G. Buckle, Aberdeenshire (GB)

(73) Assignee: Vetco Gray Inc., Houston, TX (US)

( * ) Notice: Subject to any disclaimer, the term of this patent is extended or adjusted under 35 U.S.C. 154(b) by 502 days.

(21) Appl. No.: 12/626,557

(22) Filed: Nov. 25, 2009

(65) Prior Publication Data
US 2011/0120697 A1   May 26, 2011

(51) Int. Cl.
*E21B 33/02* (2006.01)
*F16J 15/10* (2006.01)

(52) U.S. Cl. ........ 166/368; 277/339; 277/630; 277/637; 277/647; 277/649

(58) Field of Classification Search .......... 166/368; 277/338, 339, 603, 607, 608, 630, 637, 644, 277/647, 648, 649; 285/99
See application file for complete search history.

(56) References Cited

U.S. PATENT DOCUMENTS

| | | | |
|---|---|---|---|
| 2,330,425 A | 9/1943 | Hilton | |
| 2,934,363 A | 4/1960 | Knox | |
| 3,285,615 A | 11/1966 | Trbovich | |
| 3,290,047 A * | 12/1966 | Mayer | 277/647 |
| 3,797,864 A * | 3/1974 | Hynes et al. | 324/366 |
| 3,820,830 A | 6/1974 | Dryer | |
| 3,915,462 A * | 10/1975 | Bruns et al. | 277/647 |
| 4,131,289 A * | 12/1978 | Maller | 280/814 |
| 4,178,020 A * | 12/1979 | Dopyera | 285/18 |
| 4,592,558 A | 6/1986 | Hopkins | |
| 4,595,053 A | 6/1986 | Watkins et al. | |
| 5,076,594 A | 12/1991 | Baugh | |
| 5,201,835 A | 4/1993 | Hosie | |
| 5,224,715 A | 7/1993 | Downes et al. | |
| 5,246,236 A | 9/1993 | Szarka et al. | |
| 5,720,503 A | 2/1998 | Drijver et al. | |
| 5,860,680 A | 1/1999 | Drijver et al. | |
| 6,164,663 A | 12/2000 | Turner | |
| 6,719,271 B2 | 4/2004 | Faramarzi | |
| 6,869,079 B2 * | 3/2005 | Zheng | 277/511 |
| 7,559,366 B2 | 7/2009 | Hunter et al. | |
| 7,770,889 B2 * | 8/2010 | Ong et al. | 271/284 |

* cited by examiner

*Primary Examiner* — Shane Bomar
*Assistant Examiner* — Robert E Fuller
(74) *Attorney, Agent, or Firm* — Bracewell & Giuliani LLP

(57) ABSTRACT

A wellhead or Christmas tree seal assembly that forms a metal-to-metal seal between inner and outer wellhead or Christmas tree members. U-shaped metal seals having legs that face in opposite directions, are bonded to a wiping element. During installation of the seal assembly, the ends of the seal legs seal against the wellhead members and the wiping element compensates for defects on the surfaces of the wellhead members. The wiping element can be of an elastomer, metallic, or intercalated graphite material.

8 Claims, 3 Drawing Sheets

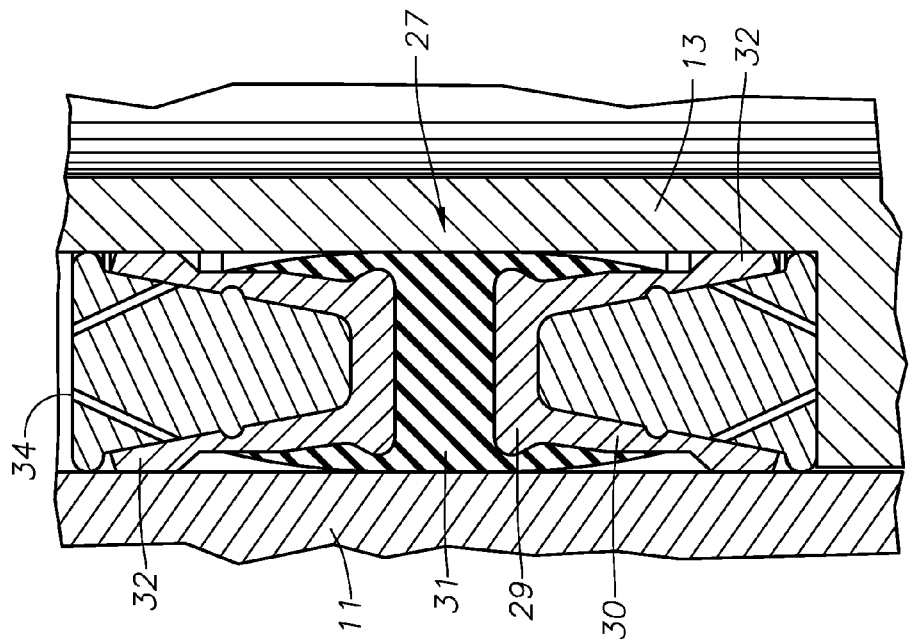
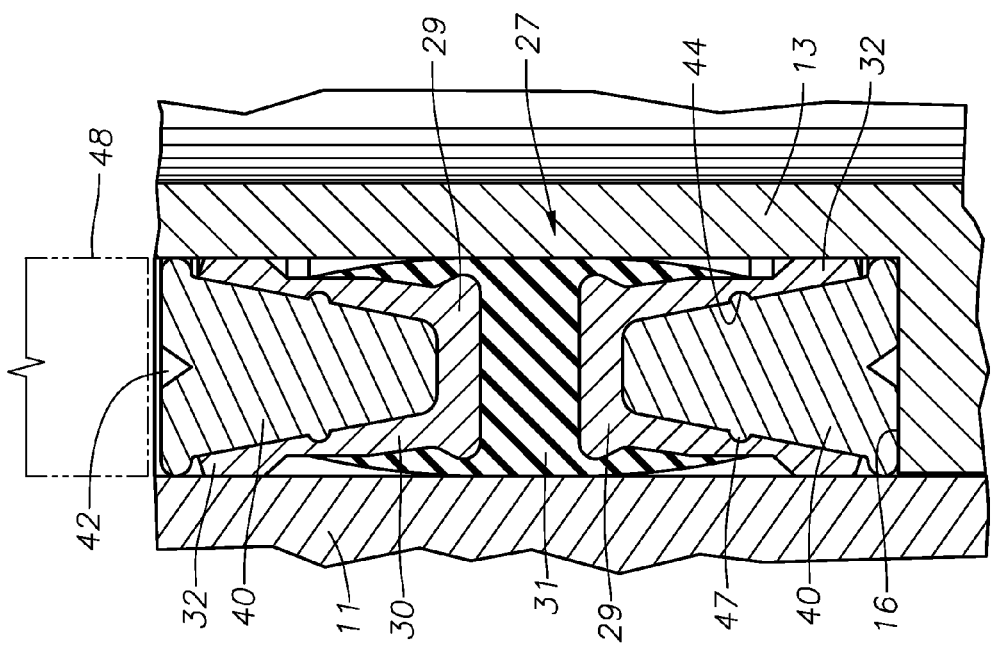

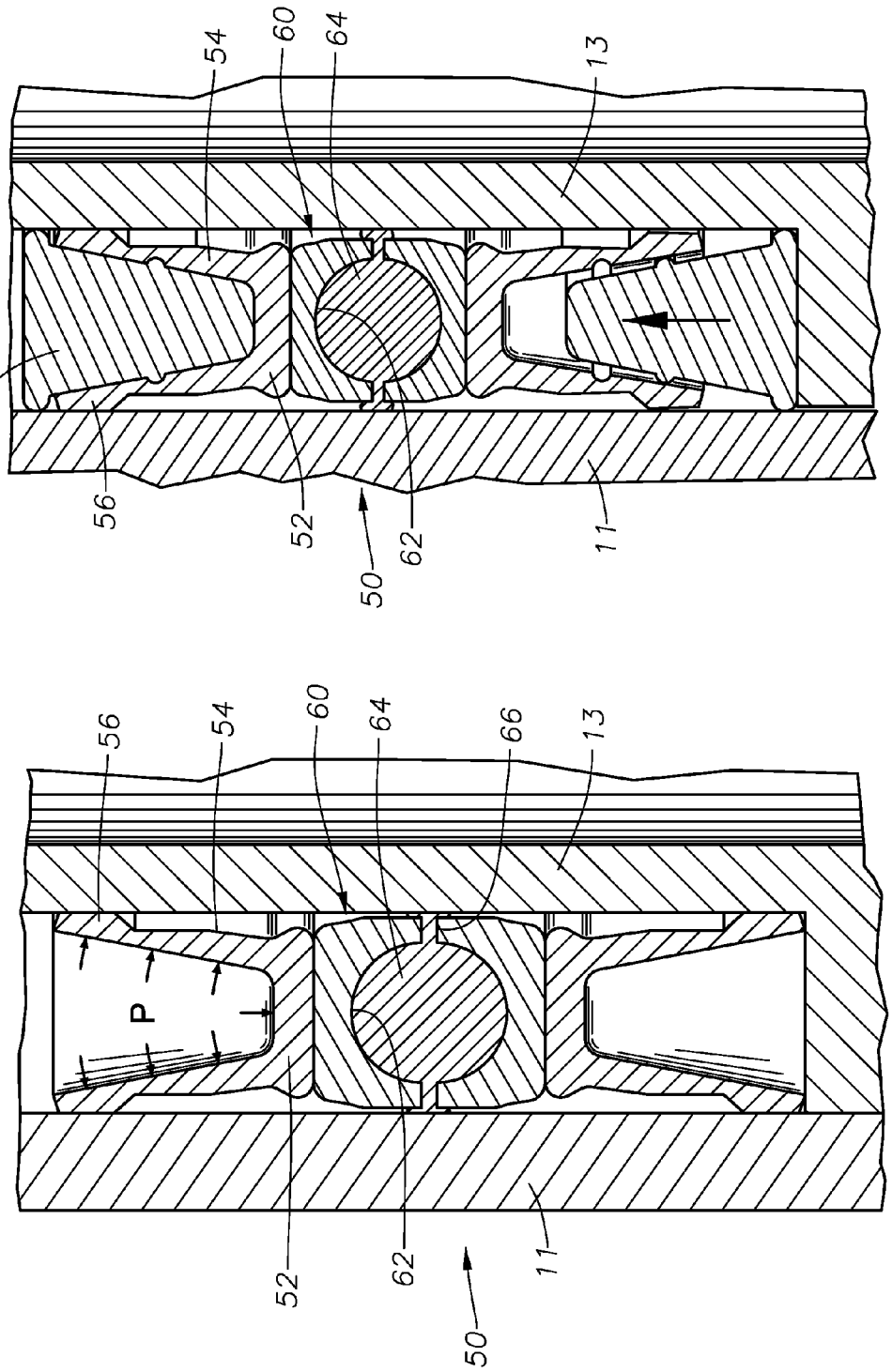

METAL-TO-METAL SEAL WITH WIPER ELEMENT AND WELLHEAD SYSTEM INCORPORATING SAME

FIELD OF THE INVENTION

This invention relates in general to subsea Christmas trees and wellhead assemblies and in particular to a seal for sealing between inner and outer wellhead members or between a Christmas tree and tubing hanger.

BACKGROUND OF THE INVENTION

Seals are used between inner and outer wellhead tubular and/or tree head members to contain internal well pressure. The inner wellhead member may be a casing hanger located in a wellhead housing and that supports a string of casing extending into the well. A seal or packoff seals between the casing hanger and the wellhead housing. Alternatively, the inner wellhead member could be a tubing hanger that supports a string of tubing extending into the well for the flow of production fluid. The tubing hanger lands in an outer wellhead member, which may be a wellhead housing, a Christmas tree, or a tubing head. A packoff or seal, seals between the tubing hanger and the outer wellhead member.

A variety of seals of this nature have been employed in the prior art. Prior art seals include elastomeric and partially metal and elastomeric rings. Prior art seal rings made entirely or partially of metal for forming metal-to-metal seals are also employed. The seals may be set by a running tool, or they may be set in response to the weight of the string of casing or tubing.

If the bore or surface of the outer wellhead or treehead member is damaged, a seal would struggle to maintain a seal. The elastomeric portion can provide additional robustness to the seal to help maintain a seal or effect a seal. However, the elastomeric portion of the seal assembly may not have sufficient radial energization and may result in leakage, sub-optimal wiping, and less robustness in the seal in general.

A need exists for a technique that addresses the seal leakage, wiping, and robustness problems described above. The following technique may solve these problems.

SUMMARY OF THE INVENTION

In an embodiment of the present technique, a seal assembly is provided that comprises two U-shaped seals that form a metal-to-metal seal and has features that increase the robustness of the seal assembly in the event surface degradation or defects in a bore of an outer wellhead or treehead member increases the difficulty of maintaining a seal. The seal assembly also has an elastomeric wiper element formed between the two seals that could wipe the bore of the outer wellhead member of debris during installation of the seal assembly. The wiping effect is applicable if the seal assembly is pressurized from above when at its final landed position. The elastomer wiping element also provides additional support for the legs of the two U-shaped seals and can provide additional radial energization for the seal assembly.

In an illustrated embodiment, wedges can be forced into the u-shaped pocket of each of the seals to create a metal-to-metal seal between the tips of the legs and the wellhead member surfaces. The wedges may also be wiping elements. The wedges/wiper further energize the elastomer radially to improve sealing and wiping of any surface defects on the bore of the outer wellhead member. Alternatively, a soft metallic material could be used in place of the elastomer in the wiping element that could additionally fill minor surface defects. The seal assembly is preferably pre-assembled onto an inner wellhead member, such as a casing hanger or tubing hanger. The casing hanger or tubing hanger and seal assembly may then be lowered into an outer wellhead member, such as a wellhead housing or treehead, in the same run and the seal set with a conventional running tool.

In an illustrated embodiment, a cavity may also be formed between the two U-shaped seals. The cavity may be filled with a soft metal or intercalated graphite compound that flows outward and inward in response to applied pressure and/or temperature. The soft metal or intercalated graphite can wipe into surface defects to effectively repair them.

The pocket formed by the legs of each of the U-shaped seals may remain empty to allow well pressure to act on the inner side of the legs, pushing the legs outward against the outer and inner wellhead members. This embodiment would not require the use of a wedge to force the legs outward into sealing contact with the outer and inner wellhead or treehead members.

The seal assembly can rest on a shoulder formed on the wellhead housing or tubing hanger and can be set by a conventional running tool that can push the seal assembly into place. Alternatively, the seal assembly could be set by pressurizing the annular space between the outer and inner wellhead or treehead members. The combination of the wiping element, the robustness added to the U-shaped seals by the wiping element that joins them, and the radial energization of the wiping element improves sealing in wellhead or treehead members having surface degradations.

BRIEF DESCRIPTION OF THE DRAWINGS

FIG. 2B is a sectional view of the seal assembly in FIG. 2A in the set position, in accordance with an embodiment of the invention.

FIG. 3 is a sectional view of a seal assembly, in accordance with an embodiment of the invention.

FIG. 4 is a sectional view of a seal assembly with a central cavity, in accordance with an embodiment of the invention.

FIG. 5 is a sectional view of a seal assembly with a central cavity and wedges/wipers, in accordance with an embodiment of the invention.

DETAILED DESCRIPTION OF THE INVENTION

Figure 1:
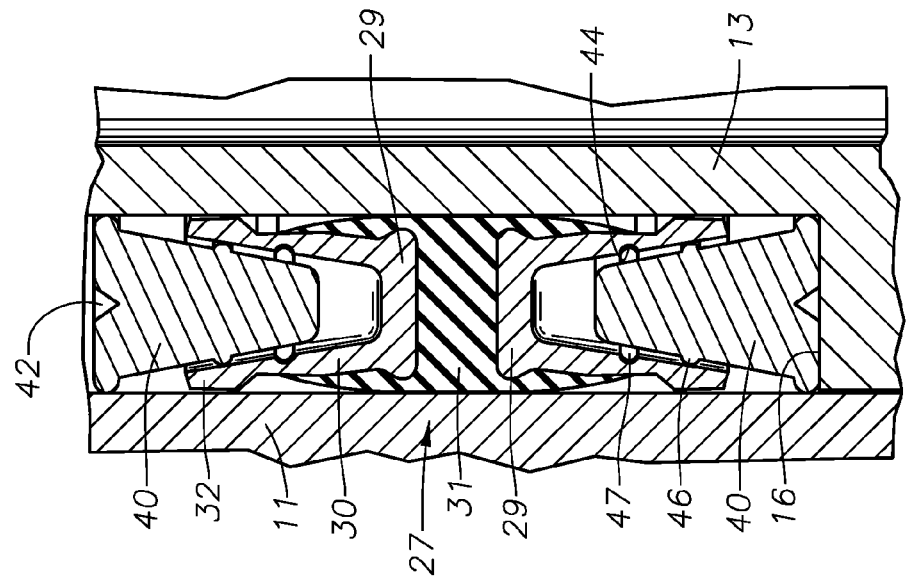
FIG. 1 is a sectional view of a seal assembly of the prior art.

Referring to FIG. 1, a seal assembly 10 of the prior art is shown located between an outer wellhead or treehead member 11 and an inner wellhead or treehead member 13. Upper and lower metallic rings 12 each have a concave shape with legs that face each other. An elastomeric seal section 14 fits in the concave space of each metallic ring 12 and bulges outward for sealing against an outer wellhead member. The bulging portion of elastomeric seal section 14 deforms against the outer wellhead member, forcing an inner side of elastomeric seal section 14 in sealing engagement with an inner wellhead housing member. Portions of rings 12 sealingly engage the inner and outer wellhead members. This engagement may be induced from elastomeric energization.

Figure 2A:
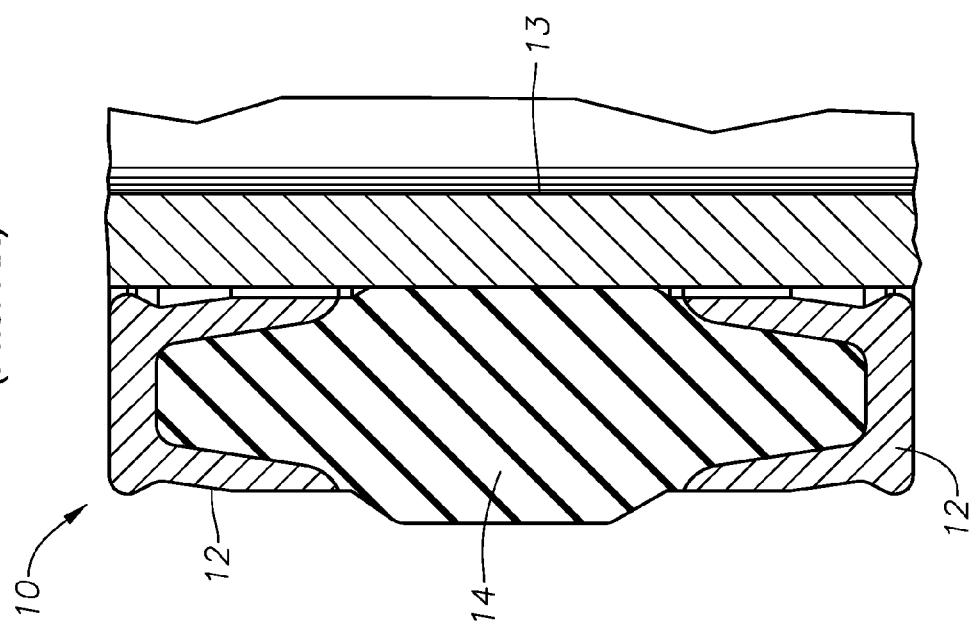
FIG. 2A is a sectional view of a seal assembly in the unset position, in accordance with an embodiment of the invention.

Referring to FIG. 2A an embodiment of the invention shows a portion of an inner wellhead or treehead member that comprises a casing hanger 13 having an outer profile and a radially extending shoulder 16. Alternatively, casing hanger 13 could instead be a tubing hanger, plug, safety valve, or other device. An annular seal assembly 27 is fitted to the casing or tubing hanger 13 via interference with the outer profile of the casing or tubing hanger 13 and is pre-assembled onto the casing or tubing hanger 13 prior to installation at the well.

The seal assembly 27 is shown in the unset position and comprises a pair of U-shaped metal seals 29 having legs 30 that face away from each other. In this example, the tips 32 of the legs 30 have outer surfaces that create a metal-to-metal seal with the bore of the wellhead or treehead housing and the outer surface of the casing or tubing hanger 13 when set. The metal seals 29 can be bi-metallic with a lower yield metal forming the areas of sealing contact, such as the tips 32 of the legs 30. The metal seals 29 in this example are bonded to a central elastomeric section or wiping element 31 that extends from approximately the tips 32 of one set of legs 30 to the other to thereby partially envelope the metal seals 29. The elastomeric section 31 further bulges outward and inward and wipes the bore of the wellhead or treehead housing 11 and the outer surface of the casing or tubing hanger during installation. The elastomeric section 31 may be radially energized to fill defects, improve sealing, and provides support to the metal seals 29. Each metal seal 29 has a base that is separated from the base of the other metal seal 29 by a portion of elastomeric section 30.

The seal assembly 27 may further comprises a pair of annular wedges or energizing rings 40 initially in the unset or run-in position and located within the U-shaped seal pocket formed by the legs 30 of the metal seals 29. The wedges 40 may have a groove 42 that can function to direct fluid pressure to further force legs 30 away from each other when seal assembly 27 is set. Detents 46 on the outer surface of wedges 40 temporarily engage grooves 44 formed on the inner surface of the legs 30. Detents 46 may be spring loaded to retract out of the grooves 44 and into the body of the wedges 40 as the wedges 40 are forced into the U-shaped seal pocket. The wedges 40 may further have surfaces that-taper toward each other or alternatively the surfaces could be cylindrical. In this embodiment, the lower wedge 40 rests on the shoulder 16 formed on the casing hanger 13. Groove 42 is circular and located on the radially thicker end of each wedge 40. Grooves 42 extend only a short distance into each wedge 40, defining short legs.

Referring to FIG. 2B an embodiment of the invention shows a portion of a wellhead housing 11 and the seal assembly 27 and casing hanger 13 described above. Housing 11 is located at an upper end of a well and serves as an outer wellhead member in this example. Housing 11 has a bore located therein. The seal assembly 27 and casing hanger 13 can be run into the bore of the housing 11 as one in a single trip with a conventional running tool 48. Alternatively, wellhead housing 11 could be a tubing spool or a Christmas tree.

During the running operation, the bulging outer portion of the elastomeric section 31 of the seal assembly 27 wipes the bore of the wellhead housing of debris to improve the sealing surface. In this embodiment, when casing hanger 13, along with the accompanying seal assembly 27, land within the bore of the wellhead housing 11. The running tool 48 can apply force to the upper wedge 40 in a conventional way. A radially extending shoulder 16 on the casing hanger 13 provides a reaction point for the applied force. The applied force causes the detents 46 (FIG. 2A) to depress to thereby allow the wedges or wipers 40 to be forced into the U-shaped pockets formed by the legs 30 of the metal seals 29. Protrusions 47 on the outer surface of the wedges 40 engage the recesses 44 on the interior of the legs 30 to hold the set position. The wedges or wipers 40 force the outer surface of the tips 32 of the legs 30 into sealing contact with the wellhead housing 11 and the casing hanger 13. Further, the applied force on the wedges. 40 compresses the central elastomeric portion 31 to radially energize it against the bore of the wellhead housing 11 to provide improved sealing, filling of surface defects on the bore, and to provide support for the metal seals 28. Alternatively, the seal assembly 27 can be set through the application of fluid pressure to the annular space to act against one of the wedges or wipers 40.

In an additional embodiment illustrated in FIG. 3, one or both of the wedges 40 can additionally have ports 34 that communicate the exterior of the wedge 40 with the interior surface of the legs 30 of the metal seal 29. The ports 34 allow trapped fluid to flow out when wedges 40 are forced into the U-shaped pocket defined by the legs 30. Additionally, the ports 34 may enable pressure to reach the inner legs of the "U" seals.

In an additional embodiment illustrated in FIG. 4, a seal assembly 50 comprising U-shaped metal seals 52 having legs 54 with tips 56, is shown. Upper legs 54 extend upward and lower legs 54 extend downward. In this example, the tips 56 of the legs 54 have outer surfaces that create a metal-to-metal seal with the bore of the wellhead housing 11 and the outer surface of the casing hanger 13 when set. The bases of the metal seals 52 in this example are bonded to a central metal body 60 having a cavity 62 that is located between the U-shaped seals 52 such that the legs 54 of the seals 60 face away from each other. The cavity 62 within the body 60 contains a flowable soft metal 64 that is extruded out from the cavity 62 via at least one passage or annular gallery 66 when seal assembly 50 is set in response to applied pressure. The soft metal 64 fills defects and accommodate surface degradation on the sealing surfaces to improve sealing. In this example, there are two passages, one facing inward and the other outward. The applied pressure also acts on the interior surface of the U-shaped metal seals 54 to force the tips 56 on the legs 54 outward and into contact with the bore of the wellhead housing 11 and the casing hanger 13. The flowable soft metal 64 therefore additionally creates a secondary metal-to-metal seal. Further, the flowable soft metal 64 may be replenished when the seal assembly 50 is picked up and set again. Alternatively, instead of a flowable metal 64, an intercalated graphite compound could be used that reacts to small temperature changes with a large change in volume to thereby flow out of the cavity 62 to fill defects and accommodate surface degradation. Further alternatively, the intercalated graphite compound may be contained within the softer metal 64 and act as an energizing mechanism to promote material flow.

In an additional embodiment illustrated in FIG. 5, annular wedges 70 can be employed with the design described in FIG. 4. In this embodiment, wedges 70 function similarly to the wedges 40 described in FIGS. 2A and 2B, to force the legs 54 of the U-shaped metal seals 52 outward and thereby create a metal-to-metal seal between the tips 56 of the legs 54 and the bore of the wellhead housing 11 and the outer surface of the casing hanger 13. The wedges 70 additionally energize the metallic body 60 to cause flowable soft metal 64 to be extruded out from the cavity 62. The soft metal 64 fills defects and accommodates surface degradation on the sealing surfaces to improve sealing. Alternatively, rather than a cavity 62, the central metallic body 60 can be fabricated from a soft metallic material that can deform outward in response to applied pressure. The soft metallic material deforms against the bore of the wellhead housing 11 to fill defects, accommodate surface degradation, and create a secondary metal-to-metal seal.

While the invention has been shown in only two of its forms, it should be apparent to those skilled in the art that it is not so limited but is susceptible to various changes without departing from the scope of the invention.

What is claimed is:

1. A wellhead assembly with an axis, comprising:
   an outer wellhead member having a bore;
   an inner wellhead member located in the bore;
   an annular seal assembly, comprising: upper and lower metal seals, each of the seals having a base with a pair of legs extending therefrom with tips that form opposing seal surfaces to sealingly engage the bore of the outer wellhead member and an exterior portion of the inner wellhead member when set into place between the outer wellhead member and the inner wellhead member, the legs of the upper metal seal extending upward, and the legs of the lower metal seal extending downward, the bases being axially spaced apart from each other;
   a central section located between the bases of the metal seals that is deformable so that when the seal assembly is set, the bases move toward each other and the central section deforms inward and outward into sealing engagement with the bore of the outer wellhead member and an exterior portion of the inner wellhead member; and
   wherein the central section is made out of an elastomeric material, the elastomeric material being attached to a side of each of the bases opposite the legs and directly attached to a portion of the outer surface of each of the legs, the elastomeric material of the central section having a greater radial thickness prior to setting the seal assembly than a thickness of the upper and lower metal seals prior to setting the seal assembly, to thereby wipe the bore of the outer wellhead member during installation.

2. The wellhead assembly according to claim 1, wherein the seal assembly further comprises annular wedges, each positioned within a channel formed by the legs of each of the metal seals, each of the wedges being axially movable relative to the seals between run-in and set positions.

3. The wellhead assembly according to claim 2, wherein each of the wedges has a detent on an outer surface that engages a recess formed on the interior surface of one of the legs of each of the seals when the wedge is in the set position.

4. The assembly according to claim 2, wherein the inner wellhead member has an upward facing shoulder, and a force applied by a running tool to an upper one of the wedges is transmitted through the lower one of the wedges to the shoulder, the shoulder acting as a reaction point to force the wedges into the channels in the set position.

5. The wellhead assembly according to claim 1, wherein the legs of each of the metal seals form a U-shape.

6. The wellhead assembly according to claim 1, wherein the bases of the metal seals are bonded to the central section.

7. A seal assembly with an axis for sealing between inner and outer members, comprising:
   upper and lower metal seals, each of the seals having a base and legs extending therefrom with tips that form opposing seal surfaces to sealingly engage a bore of the outer member and an exterior portion of the inner member, the legs of each of the metal seals forming a U-shaped channel, the legs of the upper metal seal facing upward, the legs of the lower metal seal facing downward, the bases of the metal seals being axially spaced apart from each other;
   an elastomeric central section located between the bases of the metal seals that protrudes radially outward and inward past the bases of the metal seals prior to the setting of the metal seal assembly; wherein
   the elastomeric central section is attached to the base of each of the metal seals and directly attached to a portion of the outer surfaces of the legs of each of the metal seals; and
   upper and lower wedges positioned within the U-shaped channels of the upper and lower metal seals, respectively, the wedges being axially movable relative to the bases to drive the legs of each of the metal seals outward into sealing contact with the outer and inner members and to move the bases toward each other to cause the central section to sealing engage the outer and inner members.

8. The seal assembly of claim 7, wherein each of the wedges has a detent on an outer surface that engages a recess formed on the interior surface of one of the legs when the wedges are forces into the channel in a set position.

* * * * *